United States Patent [19]
Krofta

[11] Patent Number: 5,320,750
[45] Date of Patent: Jun. 14, 1994

[54] WATER CLARIFIER WITH FIRST FILTRATE ISOLATION, IMPROVED BACKWASHING AND IMPROVED BUBBLE GENERATION

[76] Inventor: Milos Krofta, 58 Yokun Ave., Lenox, Mass. 01240

[21] Appl. No.: 885,522

[22] Filed: May 19, 1992

Related U.S. Application Data

[63] Continuation-in-part of Ser. No. 756,323, Sep. 6, 1991, Pat. No. 5,160,611, which is a continuation of Ser. No. 241,384, Sep. 7, 1988, Pat. No. 4,931,175.

[51] Int. Cl.$^5$ ............................................. B01D 24/24
[52] U.S. Cl. .................................. 210/221.2; 210/264; 210/278; 210/279; 210/286; 251/63
[58] Field of Search ............... 210/221.2, 264, 275, 210/277, 278, 279, 286, 274; 251/63, 63.5, 237, 519

[56] References Cited

U.S. PATENT DOCUMENTS

| | | | |
|---|---|---|---|
| 395,625 | 1/1889 | Moore | 210/279 |
| 607,155 | 7/1898 | Bleakly et al. | 210/279 |
| 647,780 | 4/1900 | Wilson | 210/279 |
| 1,196,058 | 8/1916 | Widner | 210/279 |
| 1,634,783 | 7/1927 | Hungerford | 210/279 |
| 2,658,033 | 11/1953 | Ferris | 210/279 |
| 3,207,312 | 9/1965 | Griswold | 210/278 |
| 3,547,270 | 12/1970 | Kass | 210/279 |
| 3,552,658 | 1/1971 | Sons | 251/63 |
| 3,788,981 | 1/1974 | Richard et al. | 210/519 |
| 3,951,816 | 4/1976 | Bascope et al. | 210/519 |
| 4,022,696 | 5/1977 | Krofta | 210/520 |
| 4,184,967 | 1/1980 | Krofta | 210/525 |
| 4,316,598 | 2/1982 | Maggio | 251/63 |
| 4,377,485 | 3/1983 | Krofta | 210/704 |
| 4,540,487 | 9/1985 | Johnson et al. | 210/286 |
| 4,554,074 | 11/1985 | Broughton | 210/519 |
| 4,626,345 | 12/1986 | Krofta | 210/104 |
| 4,931,175 | 6/1990 | Krofta | 210/86 |

*Primary Examiner*—Christopher Upton
*Attorney, Agent, or Firm*—Dike, Bronstein, Roberts & Cushman

[57] ABSTRACT

A two stage raw water clarifier with first stage flotation and second stage filtration divides at least the lower portion of a flotation tank into independent cells. A branched slotted conduit located in a filter medium in each cell collects clarified water. Valves control the flow of clarified water from each branched conduit either to a clarified water ring conduit or to a first filtrate/backwash ring conduit connected to a storage tank. The filter media is preferably a dual media, a layer of anthracite or activated carbon over a layer of sand. High cell walls and inclined baffles in each cell retain the filter media during backwashing. The baffles also slow the flotation process. A decompression valve for pressurized water with dissolved air has a very narrow annular slot in the flow path through the valve to create microscopic air bubbles of optimal size for the flotation. A movable member sets this annular slot at a proper value. A mechanical or pneumatic actuator moves the member periodically to open the slot and flush out trapped particles.

31 Claims, 4 Drawing Sheets

WATER CLARIFIER WITH FIRST FILTRATE ISOLATION, IMPROVED BACKWASHING AND IMPROVED BUBBLE GENERATION

REFERENCE TO RELATED APPLICATIONS

This application is a continuation in part of U.S. Ser. No. 07/756,323 filed Sep. 6, 1991, now U.S. Pat. No. 5,160,611, which in turn is a continuation of U.S. Ser. No. 241,384 filed Sep. 7, 1988, now U.S. Pat. No. 4,931,175.

BACKGROUND OF THE INVENTION

This invention relates in general to an apparatus and method for the clarification of water where the removal of suspended particles is accomplished by a flocculating agent and flotation using a stream of rising, microscopic air bubbles. More specifically, it relates to an improved clarification apparatus and method of the general type described in U.S. Pat. Nos. 4,626,345 and 4,931,175 using flotation combined with filtration through a bed of sand or the like at the bottom of the flotation tank.

Water clarification, the removal of particulate contaminants suspended in water, is used to treat waste water from manufacturing processes, particularly in the paper and pulp industries, in the treatment of municipal water drinking supplies, and in sewage treatment. The water can be clarified by sedimentation or flotation of the particles. Known sedimentation techniques and apparatus are efficient, but are limited even at peak efficiency to a comparatively slow sedimentation rate, about 0.5 gallons per minute per square foot. To handle large volumes of raw input water, sedimentation facilities must therefore be large, with attendant cost and space utilization disadvantages.

Flotation techniques dissolve a few percent of air by volume in pressurized water and then release the air in the form of microscopic bubbles which attach to the particles and carry them upwardly to the surface where they form a floating sludge. The particles are usually coagulated and flocculated using conventional agents such as alum and polymers before the air bubbles are introduced. Flotation techniques are theoretically capable of achieving clarification rates of 7.5 gallons per minute per square foot of flotation area. Heretofore in practice the rates have been less than this theoretical value, but significantly better than for sedimentation techniques.

Applicant holds several U.S. patents for water clarification apparatus and processes, including U.S. Pat. Nos. 4,022,696; 4,377,485; 4,626,345; 4,184,967; and 4,931,175. In the '696 clarifier, sold under the trade designations "SPC" and "Supracell", the flotation occurs in a circular tank. The raw water is fed into the tank via a central pipe, a hydraulic joint, and an inlet pipe with multiple outlets immersed in the tank which rotates about the tank. The inlet flow is oriented opposite to the direction of rotation of the inlet pipe and is at a velocity with respect to the rotation rate such that the raw water has a net zero velocity as it enters the tank. The raw water inlet flow assembly and a scoop for removing the floated sludge are mounted on a carriage that rotates about the tank. The scoop is preferably of the type described in applicant's U.S. Pat. No. 4,184,967. The rate of rotation is set so that the floated particles will reach the surface of the water held in the tank in the time of one rotation. A good degree of clarification can be achieved with each rotation of the carriage using a comparatively shallow tank, e.g. 16–18 inches.

U.S. Pat. No. 4,377,485 discloses a later clarifier of the present application sold under the trade designations "SAF" and "Sandfloat", which utilizes the basic approach of the '696 invention, also operating with the net zero velocity principle, but also adding a second filtration stage with a set of wedge-shaped sand beds covering the bottom of the flotation tank. The water clarified by the flotation process flows through the underlying sand beds into a clarified water collecting chamber. A suction apparatus mounted on the carriage periodically backwashes each section of the filter in combination with a flow of backwash water introduced through the collection chamber. During clarification, when the flocs are formed, pressurized, aerated water is introduced to the open, lower end of the flocculation chamber via a manifold with multiple outlets. The bubbles carry the flocced particulates upwardly to form a floated sludge layer. The clarification rate is comparable to that of the '696 "Supracell" clarifier.

U.S. Pat. No. 4,626,345 discloses a clarifier, sold under the trade designations "SASF" and "Sandfloat-Sedifloat". It does not utilize the net zero velocity principle, but does employ a sand bed for two stage clarification. In this apparatus, the raw water enters a central cylindrical compartment, which acts as a hydraulic flocculator, and then flows over a dividing wall into a surrounding circular flotation tank. Aerated water is added via a fixed manifold. Rotating elements include a scoop remover for the floated sludge and a suction hopper that cleans the filter beds. The scoop is the same general type as used with the Supracell and Sandfloat units described above. This '345 SASF apparatus offers a two stage clarification with a more compact unit and at a lower cost than the SAF clarifier.

While the SASF clarifier has proven to be effective, compact, and comparatively low cost, it does not meet certain regulatory requirements that first filtrate water—the clarified water that is produced after the sand bed, or a portion of the sand bed, is backwashed—be separated from the clarified water produced without the turbidity of a recent backwashing. Another problem is that the SAF and SASF clarifiers use a suction hood that covers segments of the sand bed to draw off accumulated contaminants and sludge. The SAF design uses a backwash water directed through clarified water outlets; the SASF relies solely on the action of a suction pump applied to the sand bed by the hood. As a result the SASF design does not induce a strong agitation of the sand bed which is conducive to a thorough cleaning. Also, both the SAF and SASF arrangements for backwashing remove some of filter medium with the contaminants and sludge. In the SAF unit a cyclone separator recovers the sand. Media loss considerations, in part, limit the thoroughness of the cleaning and the overall efficiency of at least the SASF clarifier.

In the SASF clarifier the sand bed portions all feed clarified water to an underlying collection well. This well then drains to a clarified water outlet. The presence of this collection well means that the first filtrate water is mixed with clarified water and that the available space for the control hydraulic flocculator is limited (530 liters, or 140 gallons, being a typical capacity for a flocculating tank of a five foot diameter SASF clarifier). This volume results in comparatively short retention times (3.8 minutes at a 140 l/min flow rate)

which limit the thoroughness of the flocculation, and hence the efficiency of the clarification. In the SAF unit, a slotted pipe is used to collect backwashed sludge, but it is located in the water, under a hood, and it is connected to a suction pump. Backwash water is supplied through chambers under the sand bed sections. Radial slotted pipes are also used in the SPC clarifier, but they are not used in any backwashing. They rotate in the flotation tank to collect clarified water; the SPC has no second stage sand filter and there is no backwashing.

The efficiency of all of these known clarifiers i also limited by the efficiency of producing microscopic bubbles of optimal size for flocculation. Ideally, the bubbles should have a diameter of 40 to 80 microns to achieve a rising velocity of 30 cm/min. Also, they should be as numerous as possible, and should exhibit as little coalescing as possible once they are formed.

A straightforward expedient to produce more bubbles is to dissolve more air into the water. However, too great a saturation of dissolved air in the water to be decompressed produces bubbles that are too large and that rise with a velocity that disturbs the optimal flotation process.

It is also known that dissolved air is not released efficiently simply by decompression of the water. Some air will remain dissolved. To release all or most of the dissolved air, there must be a strong shearing action on the pressurized water. In applicant's U.S. Pat. No. 4,931,175 pressurized water with dissolved air enters a flotation tank through a vertical tube with a central rod terminated in a round plate that is spaced from the end of the tube to provide an annular outlet. The shearing action on the pressurized water as it strikes the plate and is diverted sideways releases the bubbles more efficiently. However, the annular gap of this outlet is comparatively large, (a typical value is 3-5 mm). Also, it is varied to equalize flows to a number of outlets, not to optimize the size of the bubbles being produced. Further, the outlet opening is large enough that it will not become clogged with the particulate contaminants carried in the water. At least one unit using small discs and very small holes has been described, but the holes readily plug if the flow rate is large enough for a practical clarifier. To date no known decompression valve for pressurized water can efficiently release most of the dissolved air in bubbles of optimal size for the flotation process without serious plugging.

It is therefore a principal object of this invention to provide a two stage clarifier and method of operation where the first filtrate water is isolated from other clarified water collected from the clarifier.

Another principal object is to provide a pressurized water decompression valve and method of discharging the pressurized water with dissolved air that reliably produces microscopic air bubbles of an optimal size for flotation and with a high degree of efficiency.

Still another principal object of the invention is to provide a decompression valve that substantially reduces the amount of aerated pressurized water used and therefore the power consumed in aerating the water.

A further principal object of the invention is to prove a compact two stage clarifier and method of operation that has a higher capacity, can be operated with a higher head loss, and is more efficient than comparable known clarifiers.

Yet another advantage is to provide a two stage clarification apparatus and method with improved flotation rate and improved backwashing and media retention.

A further object of is to provide all of the foregoing advantages as well as an increased capacity hydraulic flocculator and an associated longer retention time.

Another object is to provide all of these advantages at a favorable cost of manufacture.

SUMMARY OF THE INVENTION

A two stage, flotation/filtration clarifier has a flotation tank defined by outer and inner vertical, generally cylindrical walls. A bottom wall of the flotation tank extends therebetween, but it is spaced above the clarifier bottom wall to define, in combination with the inner wall, part of a central hydraulic flocculator tank. Microscopic bubbles are introduced to the flocculated raw water near the top of the hydraulic flocculator. Raw water thus treated flows over the upper edge of the inner wall to the surrounding flotation tank.

A principal feature of this invention is that most of the flotation tank is divided by radial walls into plural, vertically extending cells that are isolated from one another. In the preferred form, each cell occupies a radial sector of the tank and extends from the bottom of the tank to a point short of its upper edge to leave an annular zone where treated water feeds to all of the cells and floated sludge collects on the surface of the water. Each cell has at its bottom a layer of a filtration medium such as sand, and preferably a dual media filter formed by a layer of fine sand and an overlying layer of particulate anthracite or activated charcoal. Each cell also has a slotted conduit and connected branch slotted conduits that extend through the sand layer adjacent the bottom wall of each cell. The slots receive the clarified water, but exclude the filter media.

An array of fixed, inclined baffles, preferably in the form of an array of channels, are mounted in the flotation tank. Preferably there are baffles in each cell spaced above the filter media. During a backwashing of the filter media through water and compressed air flows from the branched, slotted conduits, the channels allow an upward flow of the water to carry sludge and particulates back to the flocculator, but in combination with the dual media filter construction and tall cell walls they substantially eliminate media loss. Because the channels are inclined, and because rising flocks in the cell must pass through the channels to reach the surface, the channels extend the rising path length, and thereby enhance the duration and efficiency of the clarification process without a corresponding increase in the size of the flotation tank.

The branched, slotted conduits in each cell are connected to a pair of generally parallel, closed ring conduits that surround the clarifier near its lower end. A pair of pneumatically actuated valves are connected between each branched conduit and the rings. The valves, operated in a coordinated fashion with all other such valves, control fluid flows to and from the clarifier to isolate the flows from the rings from one another. One lower ring collects clarified water only and feeds it to a common clarified water outlet. The other, upper ring collects first filtrate water only from a cell or cells that have just been backwashed. It feeds the first filtrate via a conduit to a first filtrate storage tank until the turbidity subsides. This storage tank also acts as a source of water for backwashing. A conduit and an associated pump direct the stored first filtrate water under pressure to the second upper ring. With an appropriate opening and closing of valves to seal off the cells not to be backwashed, the upper ring directs the backwash water to the selected cell or cells. An external pump directs clarified water to a seal tank at a lower elevation than the flotation tank to create a large head loss that helps to drive the clarification process at a large throughput rate.

An air compressor and water pump feeding an air dissolving tube produce a flow of pressurized water with dissolved air. A conduit directs this pressurized water to an inlet distribution ring located in the hydraulic flocculator near its upper end. At least one, and preferably plural decompression valves are connected to this ring to release the water with a strong shear. This releases substantially all of the dissolved air in a stream of microscopic bubbles. Because the valves are disposed at the top of the flocculator, the bubbles have little chance to coalesce before they spill over into the flotation tank.

The decompression valves are formed from an upper and lower housing bodies secured to one another with an annular spacing between them, preferably a spacing set by a washer or washers carried on a set of bolts that extend axially between the housing bodies and secure them to one another. Shims can adjust this spacing. In a preferred form, the lower housing mounts a ring of a high strength, corrosion resistant alloy. One edge of the ring is at this gap and the ring is centered on the housing bodies. The upper housing body mounts a piston that is freely slidable axially between a first position that sets a minimum slot opening and a second position characterized by a much larger slot opening. The pressurized water is fed into the lower housing body where it flows through the ring and out of the valve through the annular gap via the narrow annular slot set by the ring and the piston in its first limit position. This slot opening is preferably in the range of 0.2 to 0.5 mm, measured axially, and is uniform.

Fluid pressures move the piston briefly into a second limit position where the slot is opened to a wide enough spacing that the water flow through the valve flushes out trapped particles. In one form, the piston has an axial passage that directs pressurized water to the back side of the piston. Because the ring has a smaller inside diameter than the outside diameter of the piston, the resulting differences in the areas exposed to the water pressure develops a force urging the piston to the first limit position. A rotatable control member, preferably driven periodically by a mechanical coupling to a rotating carriage, periodically opens a bleed port in the valve and releases this pressure, causing the piston to move to the second limit position. Continued rotation of the carriage rotates the control member to close the bleed port, causing the valve to return to its operating position. In another form, the piston is solid and a three way valve opens the region behind the piston either to a source of high pressure compressed air or to a region of low pressure, e.g. atmosphere. The difference in pressure cause the piston to move to the corresponding limit position.

These and other features and objects will be readily understood from the following detailed description which should be read in light of the accompanying drawings.

DETAILED DESCRIPTION OF THE PREFERRED EMBODIMENTS

Figure 1:
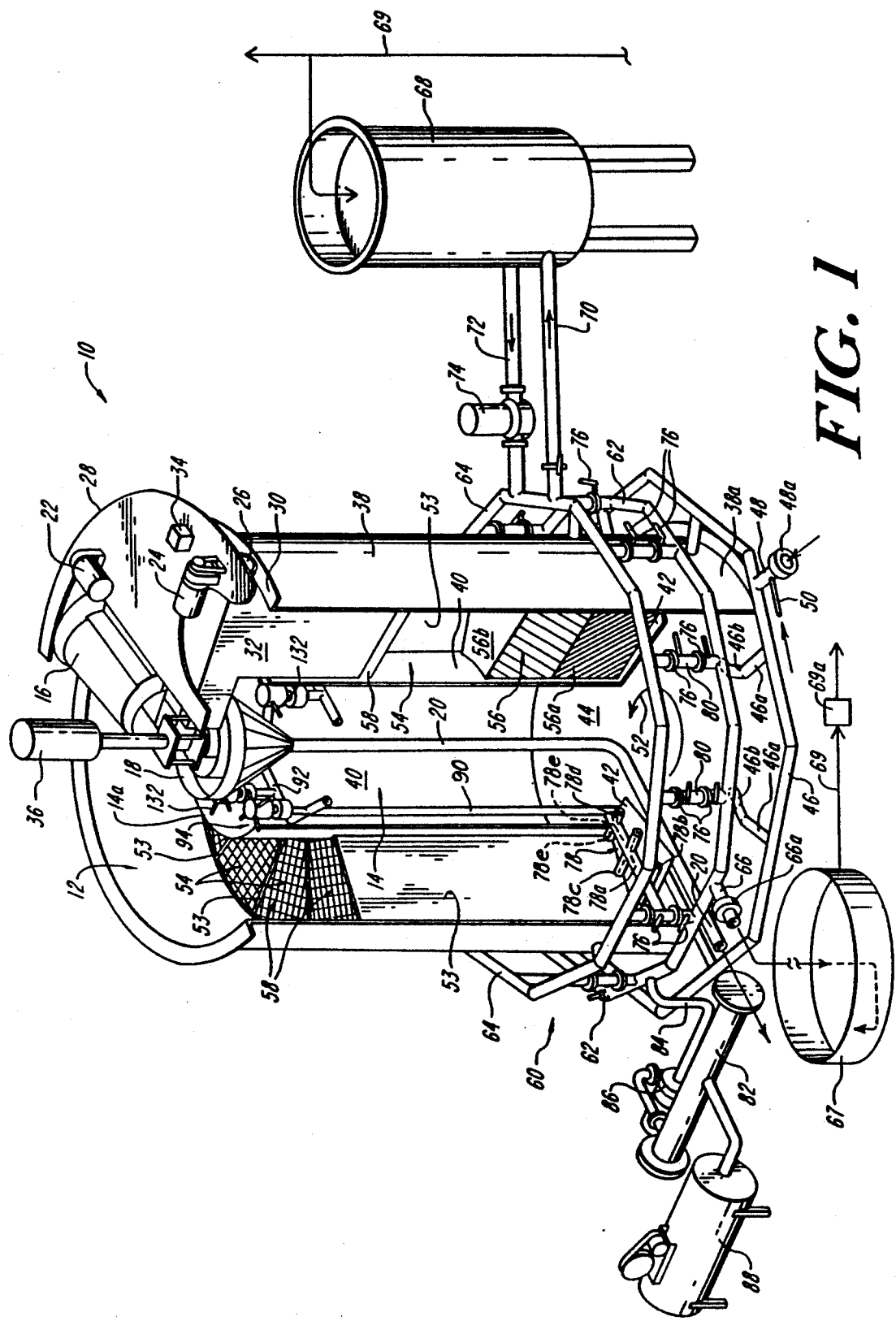
FIG. 1 is a view in perspective of a two stage clarifier constructed according to the present invention.

FIG. 1 shows a two stage clarifier 10 according to the present invention. It is an improvement over the SASF type clarifier described in U.S. Pat. No. 4,626,345. It has an outer tank 12 that surrounds an inner tank 14 serving as a hydraulic flocculator. The outer tank is a flotation tank where rising air bubbles float flocculated particles to clarify the raw water. A multi bladed scoop 16 rotates on the tank 12 to remove a floating layer of sludge that forms in the tank. The sludge is fed by the scoop to a collection cone 18 that in turn feeds a sludge outlet conduit 20. A motor 22 rotates the scoop. A motor 24 drives a wheel 26 that propels a carriage 28 around the tank with the wheel riding on a flange 30 at the upper edge of the tank 12. The carriage 28 supports the scoop 16 and a backwash hood 32. A backwash hood actuator 34 raises and lowers the hood 32 in coordination with movement of the carriage around the tank. When a cell is to be backwashed, the hood lowers to cover the cell and direct the backwash water and contaminants to the flocculator tank 14. A rotating contactor 36 supplies electrical power to the motors and the actuator.

The flotation tank 12 is defined by an outer wall 38, an inner wall 40, and an annular bottom wall 42 that bridges the wall 38 and 40. The inner wall 40 is connected continuously to, and ends at, the bottom wall 42, while the outer wall continues downwardly over a lower portion 38a to a circular, generally flat bottom wall 44 of the clarifier. The bottom walls 42 and 44, the inner wall 40 and the outer wall lower portion 38a define the inner tank 14. This tank has an increased volume as compared to the hydraulic flocculator of the earlier SASF type clarifier. In the SASF clarifier the region below the bottom wall 42 was used as a clearwell to collect clarified water. A significant advantage of the present invention is that this clearwell space is not required and is therefore available to increase the capacity of the flocculator. By way of illustration but not limitation, for a five foot diameter clarifier, the holding capacity of the inner tank 14 of the present invention is about 1,936 liters (512 gallons) as compared to 530 liters (140 gallons) for a comparable SASF clarifier. At the same raw water feed rate, e.g. 140 l/min (32 gpm), the present invention exhibits a retention time of 13.8 minutes, versus 3.8 minutes for a comparable SASF unit. At a feed rate of 227 l/m (60 gpm) the retention rate provided by the present invention, 8.5 minutes, is still more than double the retention time of the SASF clarifier.

This increased flocculator volume also allows the use of a multiple-nozzle raw water distribution ring 46. The ring receives raw water from a main inlet 48. A flocculating agent such as alum is added to the raw water via a conduit 50. A valve 48a in the inlet line controls the inlet flow rate. A set of raw water injection nozzles 46a each connect to the ring, pass through the outer wall portion 38a, and terminate in angled, narrowing tip portions 46b. The nozzles are preferably equiangularly spaced and eight in number for a five foot diameter outer tank 12. The tips 46b are horizontal and angled in the same direction to set up a swirling flow 52 in the tank 14. This swirling enhances the mixing of the flocculating chemical and the raw water to facilitate the formation of flocs in the tank 14 before the raw water spills over the upper edge 14a into the flotation tank 12. As shown, the raw water distribution ring 46 preferably surrounds the outer wall 38 immediately above the clarifier bottom wall 44.

A principal feature of this invention is that a set of radially oriented vertical divider walls 53 are secured in the flotation tank to divide all but the uppermost portion of the tank into a like number of cells 54, eleven as shown. The dividers are solid and extend vertically from the bottom wall 42 to a point near the inner tank upper edge 14a. This arrangement allows aerated, flocculated water to distribute itself uniformly in the upper portion of the tank 12, but with clarification by flotation in each cell otherwise being independent of the clarification process in other cells.

Each cell 54 is tall enough to accommodate a bed 56 of a filtration medium at its bottom, and to extend above the bed by at least a distance sufficient to accommodate an expansion of the bed during backwashing, typically twenty to thirty percent. By way of illustration, for a five foot diameter clarifier with a filtration bed with a depth of about 61 cm, the cells are about 132 cm (52 inches) high. This height also accommodates a set of baffles 58 each mounted at the upper end of each cell.

In the preferred form shown, the baffles 58 are formed by multiple channels 58a that are inclined from the vertical. Each channel blocks a direct upward movement of the filter media, while allowing a flow of backwash water to pass through to carry sludge and accumulated particulates from the filter medium to the flocculator tank 14 for reprocessing. The channels also slow the flotation process by forcing the rising flocks to traverse a longer path than a direct vertical rise, as described in the aforementioned U.S. Pat. No. 4,931,175. The smaller the angle of inclination (measured from the horizontal), the longer the path length. This effect is limited by space constraints and by the tendency of sludge to collect in the channels and impede the flotation process when the angle inclination (from the horizontal) is too small or the channels are too small. Dimensions and inclination will vary depending on the application and associated operating parameters.

Figure 4:
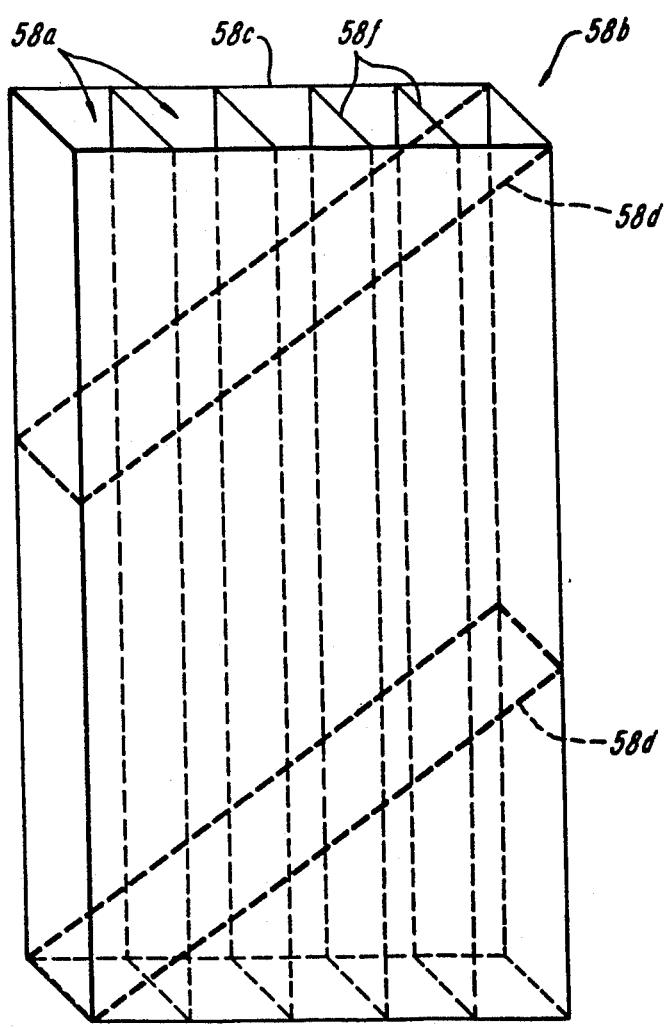
FIG. 4 is a view in perspective of a multi-channel extrusion that is cut on an angle to form one of the linear arrays of inclined baffle channels at the upper end of each flotation cell.

Preferably the channels 58a are formed in linear array 58b extruded in plastic as a unit as shown in FIG. 4. Each linear array extends across a cell 54 in a direction transverse to the radial direction. An array may be cemented end-to-end to a like array or arrays in order to extend across the cell. Similarly; radially adjacent side walls of the arrays can be cemented to one another. Radially adjacent linear arrays 58b are alternated to slope in opposite directions. The slope of cut lines 58d,58d shown is reversed to form oppositely sloping arrays. In the preferred form interior dividing walls 58f are mutually spaced to produce channels each generally square in cross section and defining generally equal cross sectional flow areas. By way of illustration, but not of limitation the channels can have cross sectional dimensions of 1 inch$^2$ with an angle of inclination from the horizontal of 60°. A typical vertical height of the baffles 58 is 6 to 8 inches. The baffles 58 extend fully across the cell.

The present invention preferably uses a dual media filter formed by a layer 56a of sand, or equivalent fine filter material, with an overlying layer 56b of a coarser material, preferably anthracite. In the preferred form, the sand has an average diameter of 0.35 mm and the anthracite has an average diameter of 0.8 to 1.0 mm. Each layer preferably has a depth of about 30 cm. When the baffle units 58 are used, and when this bed is expanded, or fluidized, during backwashing, even with a flow rate as high as 20 to 25 gpm/feet$^2$ and accompanied by a brief, violent agitation of the bed with a flow of compressed air, there is negligible media loss.

Another principal feature of this invention is a dual ring/branched collection conduit system 60 for collecting clarified water first filtrate water, and conducting backwash water to a selected cell or cells while maintaining isolation between the clarified water and the first filtrate water. A clarified water conduit 62 surrounds the outer tank 12 near its bottom wall 42. A first filtrate water conduit 64 also surrounds the outer tank 12, preferably parallel to the ring conduit 62 and closely spaced from it, as shown. Each ring 62,64 is a closed loop to provide a common flow path from and to all of the cells 54. Clarified water accumulated in the ring 62 flows to a main clarified water outlet 66 via a control valve 66a which empties into a tank 67 located below the clarifier to develop a large head loss. The tank 67 is preferably set at ten feet below the flotation tank. This head loss, and the use of pumps to develop pressure for backwashing, drive a comparatively high throughput rate for the clarifier. Valves 48a and 66a, operating in combination or with one set at a fixed rate and the other being variable, control the water level in the flotation tank 14 in response to a conventional water level sensor.

Turbid first filtrate water flows in the ring 64 to a first filtrate storage tank 68 external to the tank 12 via conduit 70. Conduit 72 with a pump 74 connected into the conduit draws water from the tank 68 to the ring 64 for use in backwashing. The volume of water diverted during a turbidity spike from a backwashed cell to the tank 68 is sufficient to supply enough water to backwash another cell 54. In addition, clarified water from tank 67 can be supplied via line 69 and pump 69a to the tank 68 to maintain its water level at a predetermined value sufficient for the backwashing.

Both rings 62 and 64 connect via a network of pneumatic, automatically operated valves 76 to a set of branched, slotted conduits 78 located at the bottom of each cell 54 in the sand layer 56a, adjacent the bottom wall 42. In the presently preferred form shown, each branched conduit 78 has a main conduit 78a and smaller diameter branch conduits 78b, 78c and 78d that extend horizontally and at right angles to the main conduit 78a toward and just short of, the divider walls 53 that define the cell. The conduits contain elongated slots 78e formed in their undersides to receive clarified water that has passed through the filter media, but rejecting he sand. The slots penetrate the conduit walls, and are typically 2-6 inches long and 0.2 to 1 mm wide depending on the size of the sand. Each main conduit 78a passes through the outer wall portion 38a and connects to a short T connector 80 to both rings 62 and 64. One of the valves 76 is secured in each branch of the T connector, on opposite sides of the conduit 78a, so that the opening of one of those pairs of valves 76 and the simultaneous closing of the other valve directs the flow of water from the branched conduit 78 to either ring 62 or 64, while blocking any significant cross flow between these rings.

In normal operation without any cell being backwashed, all of the "upper" valves 76 adjacent the ring 64 are closed, and all of the lower valves 76 are open so that collected clarified water in the branched conduits 78 flows to the ring 62 and then to the outlet 66. During backwashing of a cell, the upper valve 76 associated with that cell is opened and the associated lower valve 76 to the ring 62 is closed. The other upper valves 76 remain closed and the other lower valves 76 remain open. Concurrent activation of the pump 74 and hood actuator 34 produces a flow of water from the storage tank 68 to the cell to be backwashed. It is distributed by the branched conduit at the bottom of the bed 56, fluidizing the entire bed effectively. The backwash flow rate for a five foot diameter clarifier is preferably 20 to 25 gpm/ft². After backwashing is completed, the valves remain in the same condition. This directs the first filtrate water from the cell that has just been backwashed to the storage tank 68 while the collection of clarified water continues via ring 62 from the other cells. The dual rings, the network of automatic valves communicating to the branched conduits, and the organization of the flotation tank and the filter bed into cells that are to a larger extent operatively isolated, provides an isolation of the first filtrate from the clarified water.

A portion of the clarified water is diverted to an air dissolved tube (ADT) 82 via a conduit 84 and a pump 86 to pressurize the water. An air compressor 88 supplies compressed air to the ADT to dissolve it in the pressurized water. A conduit 90 carries the pressurized water with dissolved air produced in the ADT into the clarifier 10. More precisely, the pressurized water is added to the flocculator tank 14 at its upper end using a distribution ring 92 that feeds a set of decompression valves 94. Positioning the valves near the top of the flocculator aerates the treated water directly and reduces the opportunity for the microscopic air bubbles in the treated water to coalesce.

Figure 2:
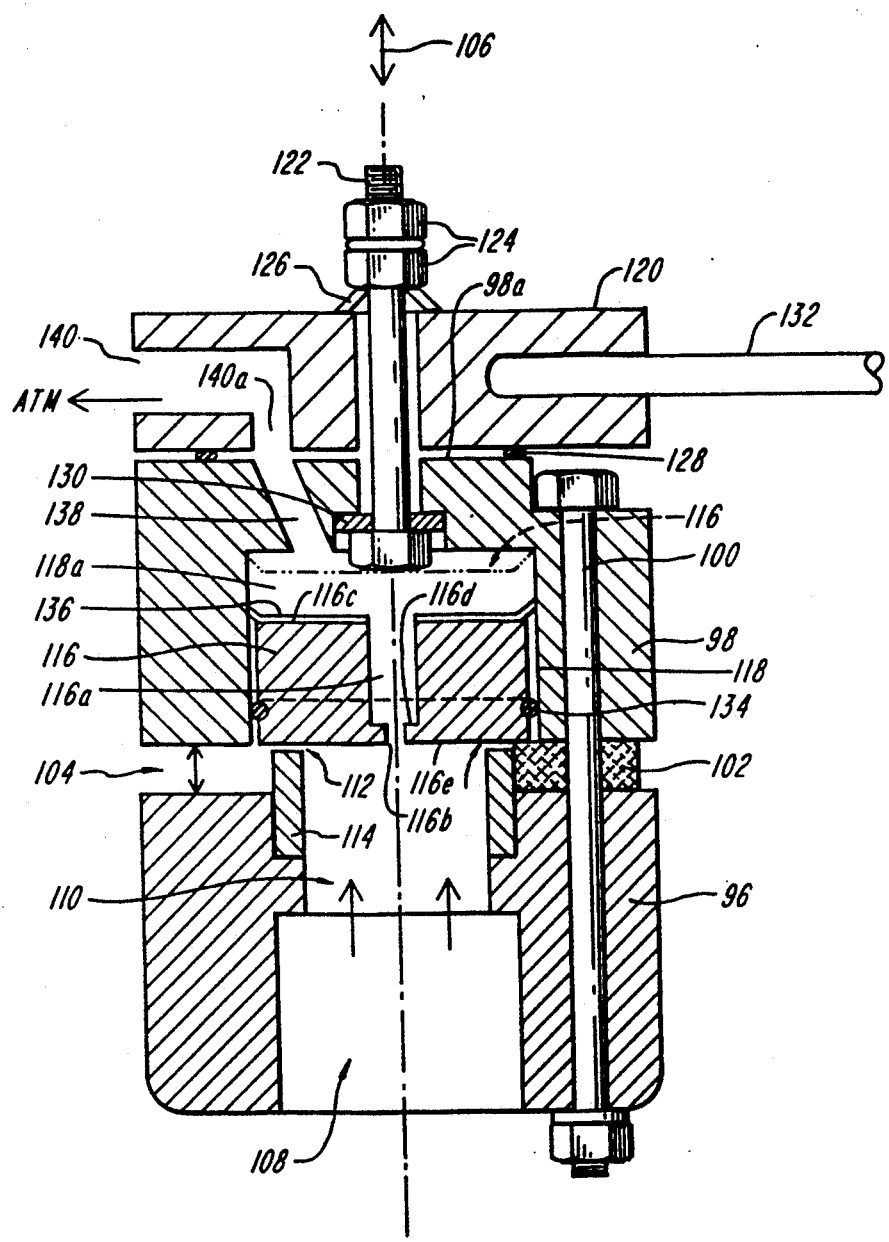
FIG. 2 is a detailed view in vertical section of one of the pressurized water decompression valves constructed according to this invention and shown in FIG. 1.

Another principal feature of the present invention is the construction and method of operation of the decompression valves 94 to produce microscopic air bubbles of the optimal size for the flotation process, and to do so with an efficient utilization of the available air dissolved into the water. FIG. 2 shows a preferred embodiment of the valve 94 where the valve is mechanically actuated to purge itself. The valve has a housing formed in two main parts, a lower housing body 96 and an upper housing body 98. Three bolts 100 each with washer 102 sandwiched between the bodies 96 and 98 secure the housing bodies to one another and set an annular gap 104 around the side of the valve. The gap 104 is continuous except for the washers and bolts. The gap dimensions are fixed during operation in the axial direction, indicated by arrow 106. The lower body 96 has an inlet 108 that threads onto vertical outlet pipes of the distribution ring 92. The inlet 108 directs the pressurized water via a central passage 110 to a narrow annular slot 112 immediately before the gap 104. In the preferred form, this slot is defined by a ring 114 and a piston 116 held in a central cylindrical bore 118 formed in the upper housing body 98. The ring is formed of any of a wide variety of abrasion resistant high alloys. The ring is press fit and replaceable.

The size of the opening of the slot 112 in the axial direction has been found to be very important to the efficient generation of microscopic air bubbles. In normal operation, the slot opening is preferably set in the range of 0.2 to 0.5 mm (about 0.01 to 0.03 inch). Such settings create a high dynamic friction, which, in combination with the shear produced as the flow suddenly changes direction from axial to lateral, produces microscopic air bubbles with a size ideal for flotation from 40 to 80 microns. It also does so very efficiently, releasing substantially all of the dissolved air and therefore producing a large volume of bubbles. The exact value for the slot opening will depend on operating parameters such as the flow rate, the percentage of clarified water to be recycled, the pressure drop across the slot, the number of valves in use, and the concentration of particulates in the water. This efficiency in the production of a large volume of ideally sized bubbles has a significant beneficial effect on the power required to produce pressurized, aerated water in the ADT 82.

A main problem with the use of such a narrow slot is that particulates carried in the water are trapped in the slot and they will rapidly clog the valve. The present invention solves this problem by having the piston axially movable between a first limit position, as shown, where it is closely spaced from the ring 114 to set the desired narrow slot, and a second limit position (shown in phantom) where the piston is displaced away from the ring 114. In this second limit position the slot opening is large enough for a sudden and large flow of the pressurized water to purge the trapped particles and clear the valve. This occurs quickly, after which the piston is returned to its first limit position. A typical value for the slot opening during this purge is 0.2 inch (about 5.0 mm). With the piston withdrawn this far, the slot opening is limited only by the spacing between the outside edge of the ring 114 and the inside diameter of the bore 118, not by the ring-to piston spacing. The duration and strength of the purge flow should not be so great as to destroy flocs.

In the FIG. 2 embodiment, a control disc 120 is rotatably mounted on the center of the upper body 98 by a bolt 22. Locking units 124 secure the disc on the body 98. A Belleville spring 126 urges the disc 120 against the body 98 to establish a sliding face seal between these parts. Preferably an o-ring 128 or equivalent seal member is used to ensure a reliable seal despite the mutual sliding movement of the body 98 and the disc 120. Another seal 130 blocks a fluid flow around the bolt 122. A set of four radially extending rods 132 are each secured at one end in the disc 120. Their free ends are positioned to be engaged by the carriage 28 and each rotated through 90° as the carriage travels through a like angular distance.

The piston 116 containing an axially extending passage 116a terminating in a smaller opening 116b facing the passage 110. In normal operation the passages 116a, 116b allow pressurized water to flow from the passage 110 to the bore 118 where it acts on the rear end face 116c of the piston, and the small annular region 116d in the passage 116a. Because the high water pressure in the passage 110 extends only to the inside diameter of the ring 114, the area of piston end surface 116e exposed to the pressurized water is less than the area exposed at surfaces 116c and 116d. This difference in areas exposed to substantially the same pressures produces a net fluid force that urges the piston to move to its first limit position. As shown, the piston is sealed and guided at its cylindrical side surface by an o-ring 134 and an edge seal member 136. These seals block a water flow around the piston that would bypass the slot 112.

A bleed port 138 is formed in the end wall 98a of the upper housing body 98. A bleed passage 140 is formed in the disc 120. As the disc 120 rotates, when inlet 140a to the passage 140 overlies the port 138 on the outer surface of the wall 98a, the bore volume 118a behind the piston 116 is opened to a lower pressure region, atmosphere. The pressurized water flows out through the passages 138,140, causing the fluid pressure on the surfaces 116c and 116d to drop to a level that allows the water pressure on the surface 116e to drive the piston to its second limit position. Continued rotation of the disc 120 closes the port 138 as a solid position of the disc closely overlies the port at the outer surface of the end wall 98a. The port 138 and passage 140 are aligned briefly, typically for a portion of a second, but this is sufficient to place the piston in the second limit position for a like interval, which is sufficient to open slot 112 in the valve 94. With one port 140 in the disc and four rods 132, the valve 94 is purged once in every four revolutions of the carriage 28 around the clarifier. Additional ports 140 or 138 or a different number or design of the rods 132 can result in more or fewer purges in the same cycle or cycles of operation.

Figure 3:
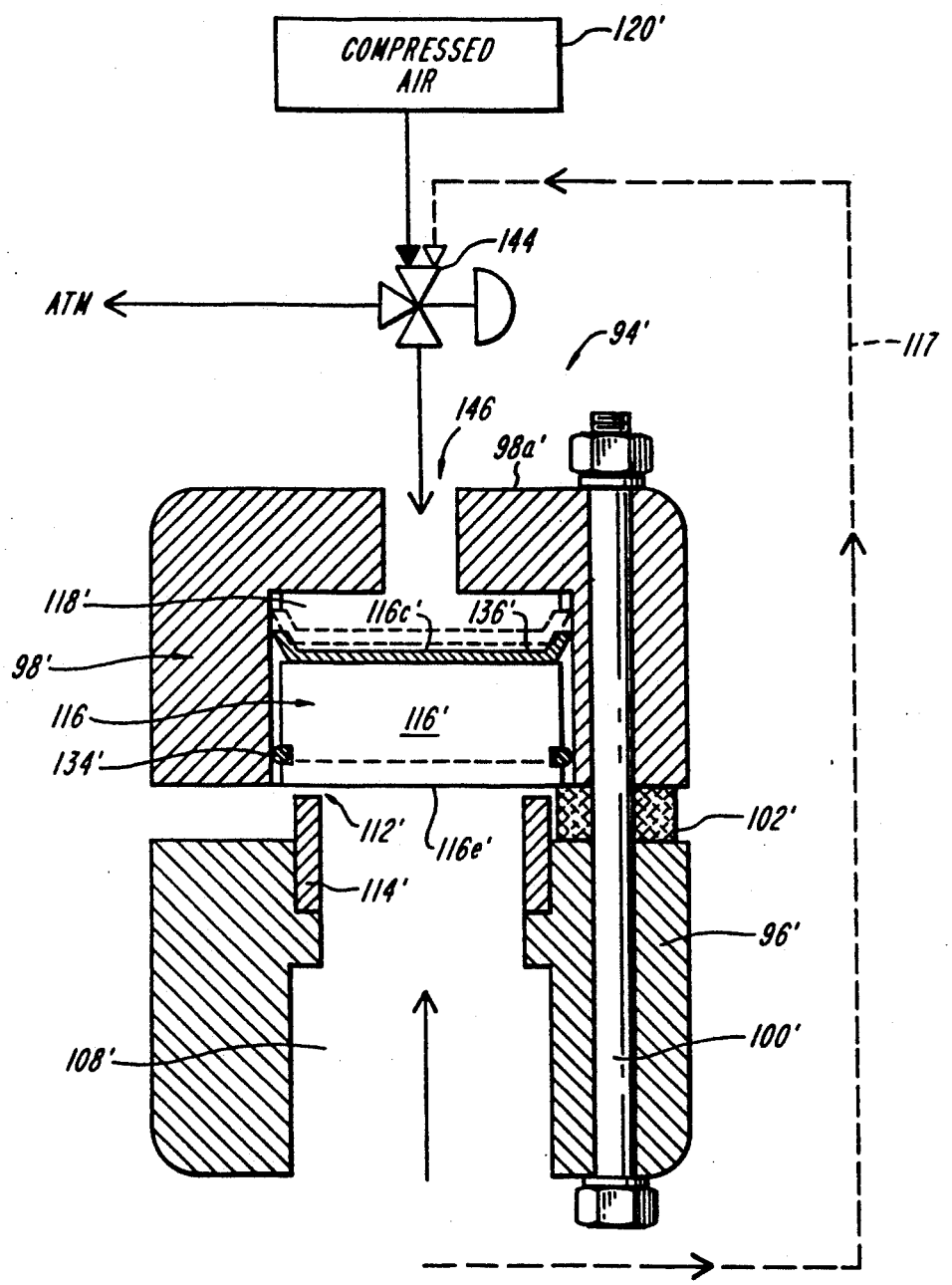
FIG. 3 is a view corresponding to FIG. 2 of an alternative pneumatic embodiment of the decompression valve of the present invention.

FIG. 3 shows an alternative embodiment of the valve 94', like parts being identified with the same reference number, but primed. The construction and principles of operation of the valve 94' are the same as for the valve 94, except that the piston 116' is solid and is positioned and moved using pneumatic actuation rather than a mechanical actuation. A source of compressed air 116c' is directed against the back surface 116c' of the piston 116' via a three way valve 144 and a passage 146 in the end wall 98a'. The air pressure is sufficient to drive the piston to the first limit position against the opposed force developed by the pressurized water acting on the surface 116c'. To purge the valve 94', the valve is activated to close off the compressed air and to open the bore 118' to atmosphere. This drops the pressure acting on the surface 116c' through the sealing member 136' causing the piston to move to the second limit position. Pressurized water can be used instead of compressed air. For example, line 117 can divert a portion of the pressurized, aerated water flow from the inlet 108' to the valve 144.

Clarifiers built according to the present invention cannot only handle larger flow rates than prior SASF clarifiers of comparable size, they also are more efficient. For raw water entering the clarifier 10 having 400 parts per million (ppm) contaminants, the clarified water exiting the unit has been measured as having 11.2 ppm contaminants. This is a greater efficiency than achievable even with less compact units such as the SPC clarifier.

There has been described an improved two stage clarifier that isolates a first filtrate flow following backwashing from a steady state clarified water flow. There has also been described a novel decompression valve for pressurized water with dissolved air that produces air bubbles of the optimal size for flotation without clogging of the valve. The clarifier has an increased capacity and a increased efficiency. It also reduces media loss to a negligible level and allows a thorough clearing of the filter bed at frequent intervals.

While the invention has been described with respect to its preferred embodiments, various modifications and alterations will occur to those skilled in the art from the foregoing detailed description and the accompanying drawings. For example, while a set of parallel closed ring conduits with a network of valves has been disclosed to collect and separate the flows from the clarifier, various other arrangements for controlling and separating flows can be used. The rings, for example, can be C-shaped, or be replaced by an array of conduits originating at each cell, albeit with some attendant increase in cost. Similarly the branched, slotted conduits can be replaced by a variety of arrays or functionally equivalent structures such as a low height compartment with fluid apertures on one or several faces. Compartmentalization of the flotation tank can also be effected in mechanically different ways. The decompression valves can also take a variety of forms. The ring 114 can be made to be a movable element. The piston can be spring biased with a fluid pressure driving a movable element against the spring force. The gap can be formed by structures other than ring piston or shim spaced washer combinations, e.g. a tubular inlet spaced over a flat surface. A direct mechanical or electro/mechanical (e.g. a solenoid-driven piston) arrangement can be devised to periodically open the narrow slot to clear it. The baffles 58 can also be configured in a wide variety of forms. They can be located above the cells or formed as sets of concentric curved plates that are inclined to overlap one another. These and other variations and modifications are intended to fall within the scope of the appended claims.

What is claimed is:

1. A clarifier has an inlet for raw water with particulate contaminants, a flotation tank where the contaminants are flocculated by a chemical agent added to the inlet water and floated to the surface of the water in the flotation tank by microscopic air bubbles where they form a floating layer of sludge, a layer of a filtration medium disposed at the bottom of the flotation tank to filter the water before it flows to a clarified water outlet, and means for removing the floated sludge from the tank and directing it to a sludge outlet, comprising, means for dividing at least the lower portion of said flotation tank and the filter medium into a plurality of vertically extending cells, means disposed in each of said cells to establish fluid communication with the filtration medium located in an associated one of said cells first means connected to all of said cells for withdrawing clarified, filtered water from first selected ones of said cells via said fluid communication means, means for storing first filtrate, second means connected to all of said cells and said first filtrate storage means for directing first filtrate water to and from the filtration medium in at least a second selected one of said cells via said fluid communication means, means for backwashing the filtration medium in at least one of said cells with first filtrate water flowing to said at least one cell from said second means, and valve means associated with each of said cells and each connected between said first and second means for isolating said first filtrate water from said clarified water, said valve means operable to selectively connect said second means to the filtration medium in said second selected one of said cells in coordination with said backwashing.

2. The clarifier of claim 1 wherein said backwashing means includes a first filtrate storage tank, and wherein said second withdrawing means directs the withdrawn first filtrate water to and from said first filtrate storage tank.

3. The clarifier of claim 2 wherein said backwashing means includes backwash conduit means connecting said first filtrate storage tank to said second withdrawing means, and a pump operatively coupled in said backwash conduit means.

4. The clarifier of claim 3, wherein said backwash means includes means for retaining said filtration medium in said cells.

5. The clarifier of claim 4 wherein said retaining means includes forming the vertical walls defining said cells to be sufficient to accommodate the expansion of said filtration medium during said backwashing.

6. The clarifier of claim 5 wherein said retaining means further comprises a plurality of inclined baffles disposed in each of said cells above said filtration medium, said baffles being sized and oriented to slow the flotation of the flocculated contaminants and to block the movement therethrough of said filtration medium.

7. The clarifier of claim 6 wherein said baffles are an array of inclined channels.

8. The clarifier of claim 1 wherein said first and second withdrawing means each comprise a ring conduit that surrounds said tank, and a plurality of clarified water collection means located in said filtration medium in each of said cells, and wherein said valve means selectively connects each of said collection means with a selected one of said first and second ring conduits.

9. The clarifier of claim 8 wherein said collection means each comprise a branched conduit network with apertures formed in said conduits to receive clarified water.

10. The clarifier of claim 9 wherein said apertures are elongated narrow slots.

11. The clarifier of claim 8 wherein each of said valve means comprises a pair of valves connected between each of said collection means and said first and said second ring conduits.

12. The clarifier of claim 11 wherein said valves are pneumatic and operable automatically in coordination with the operation of said clarifier.

13. The clarifier of claim 1 wherein said clarifier has a bottom wall, a generally cylindrical outer side wall, a generally cylindrical inner side wall, and an annular flocculation tank bottom wall extending between said inner wall and said outer wall and spaced above said clarifier bottom wall, said outer wall extending below said inner wall to define, in combination with said inner wall, said clarifier bottom wall and said flocculation tank bottom wall, a hydraulic flocculation tank.

14. The clarifier of claim 13 further comprising a raw water distribution means that includes a ring-conduit that surrounds said outer wall and receives raw water from the raw water inlet, and a set of secondary inlet nozzles that each extend from said ring conduit and into said flocculation tank, said nozzles being angled in the same direction to induce a swirling motion in the raw water in the hydraulic flocculation tank to promote the flocculation of the particulate contaminants.

15. The clarifier of claims 1 or 13 further comprising a source of pressurized water with dissolved air, at least one pressurized water decompression valve, and a conduit directing the pressurized water with dissolved air from said source to said at least one pressurized water decompression valve.

16. The clarifier of claim 15 wherein said pressurized water decompression valve comprises
a body with an inlet for said pressurized water containing dissolved air, and an outlet for the water and microscopic bubbles of released air,
slot means formed by at least one movable member, said slot means being disposed within said body between said inlet and outlet and oriented transverse to the flow of water from said inlet along a first direction, said member movable between a first position where said slot is sufficiently narrow to produce microscopic air bubbles of an optimal size for flotation, and a second position where the slot is increased in size to flush particulate contaminants from said slot, and
means for periodically moving said movable member between said first and second positions.

17. The clarifier of claim 6 wherein said body includes upper and lower housing bodies mutually separated along a first axis by an annular gap in direct fluid communication with said slot means, said lower housing part having said inlet passage that receives said pressurized water with dissolved air, and wherein said at least one movable slot forming member comprises a piston freely movable within said upper housing body between said first position, where one face of the piston, in conjunction with said lower housing part, defines said slot means, and said second position.

18. The clarifier of claim 17 wherein said lower housing part includes a ring that together with said piston defines said slot means, said ring having an inner diameter that is smaller than the outer diameter of said piston.

19. The clarifier of claim 18 wherein said piston is generally cylindrical and has a first end surface facing said ring and a second end surface facing said upper housing body, and said periodic moving means includes a passage formed in said piston extending from said first end surface to said second end surface so that the force produced by fluid pressure acting on said second end surface is greater than the opposite force produced by the fluid pressure acting on said first end surface.

20. The clarifier of claim 19 wherein said periodic moving means includes
a bleed port formed in said upper housing part extending from the region adjacent said second piston end surface to the exterior of said upper housing body, and
a controller rotatably mounted on said upper housing body and having at least one bleed passage formed therein, said controller blocking any significant fluid flow through said bleed port except when said bleed passage overlies said bleed port to reduce the fluid pressure acting on said second end surface to a level that causes the piston to move to said second end surface to a level that causes the piston to move to said second position.

21. The clarifier of claim 16 wherein said slot means has a generally uniform opening in said first direction that is smaller than the opening of said annular gap.

22. The clarifier of claim 19 wherein said slot opening is in the range of 0.2 to 0.5 mm.

23. The clarifier according to claim 16 wherein said moving means for placing comprises a source of a pressurized fluid connected to the interior of said upper housing part, where said fluid pressure is of a sufficiently large value to drive said piston to said first position, and a valve connected to said source and operable between a first position where said pressurized fluid source is applied to said piston and a second position where said compressed fluid source is blocked from said piston and the region defined by said piston and said upper housing body is opened to a region of reduced fluid pressure, whereby said pressurized water in said lower housing body drives said piston to said second position.

24. A decompression valve that releases air as a stream of microscopic bubbles from a flow of pressurized water with dissolved air supplied to a flotation tank of a clarifier, comprising a body with an inlet for said pressurized water containing dissolved air, and an outlet for the water and the microscopic bubbles of released air, slot means formed by at least one movable member, said slot means being disposed within said body between said inlet and outlet and oriented transverse to the flow of water from said inlet along a first direction, said member movable between a first position where said slot is sufficiently narrow to produce microscopic air bubbles of size desirable for flotation, and a second position where the slot is increased in size to flush particulate contaminants from said slot, and means for periodically moving said movable member between said first and second positions.

25. The decompression valve of claim 24 wherein said body includes upper and lower housing bodies mutually separated along a first axis by an annular gap in direct fluid communication with said slot means, said lower housing part having said inlet passage that receives said pressurized water with dissolved air, and wherein said at least one movable slot-forming member comprises a piston freely movable within said upper housing body between said first position, where one face of the piston, in conjunction with said lower housing part, defines said slot means, and said second position.

26. The decompression valve of claim 25 wherein said lower housing part includes a ring that together with said piston defines said slot means, said ring having an inner diameter that is smaller than the outer diameter of said piston.

27. The decompression valve according to claim 26 wherein said periodic moving means for placing comprises a source of a pressurized fluid connected to the interior of said upper housing part to drive said piston to said first position, and a valve connected to said source and operable between a first position where said pressurized fluid source is applied to said piston and a second position where said compressed fluid source is blocked from said piston and at the same time the region defined by said piston and said upper housing body is opened to atmosphere, whereby said pressurized water in said lower housing body drives said piston to said second position.

28. The decompression valve of claim 25 wherein said piston is generally cylindrical and has a first end surface facing said ring and a second end surface facing said upper housing body, and said periodic moving means includes a passage formed in said piston extending from said first end surface to said second end surface so that the force produced by fluid pressure acting on said second end surface is greater than the opposite force produced by the fluid pressure acting on said first end surface.

29. The decompression valve of claim 28 wherein said periodic moving means includes a bleed port formed in said upper housing part extending from the region adjacent said second piston end surface to the exterior of said upper housing body, and a controller rotatably mounted on said upper housing body and having at least one bleed passage formed therein, said controller blocking any significant fluid flow through said bleed port except when said bleed passage overlies said bleed port to reduce the fluid pressure acting on said second end surface to a level that causes the piston to move to said second end surface to a level that causes the piston to move to said second position.

30. The decompression valve of claim 24 wherein said slot means has a generally uniform opening in said first direction that is smaller than the opening of said annular gap.

31. The decompression valve of claim 30 wherein said slot opening is in the range of 0.2 to 0.5 mm.

* * * * *